No. 718,981. PATENTED JAN. 27, 1903.
L. C. CLARK.
PLANE.
APPLICATION FILED OCT. 1, 1901.
NO MODEL.
2 SHEETS—SHEET 1.
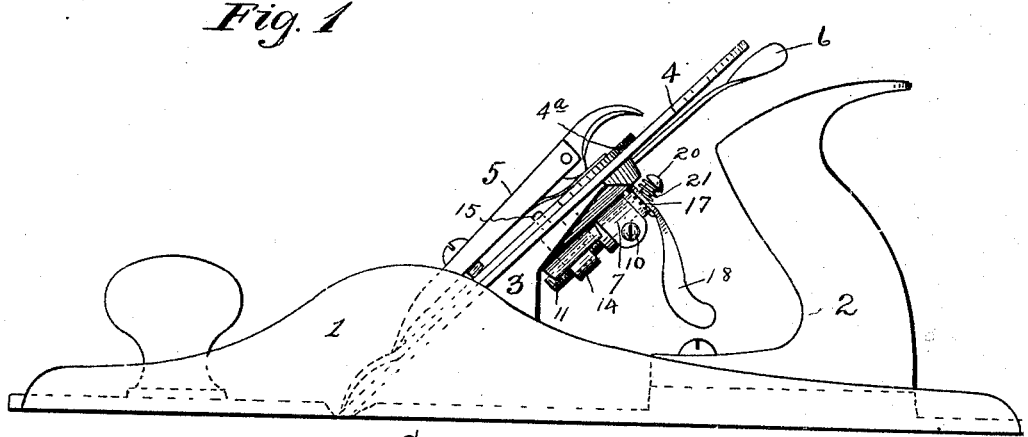
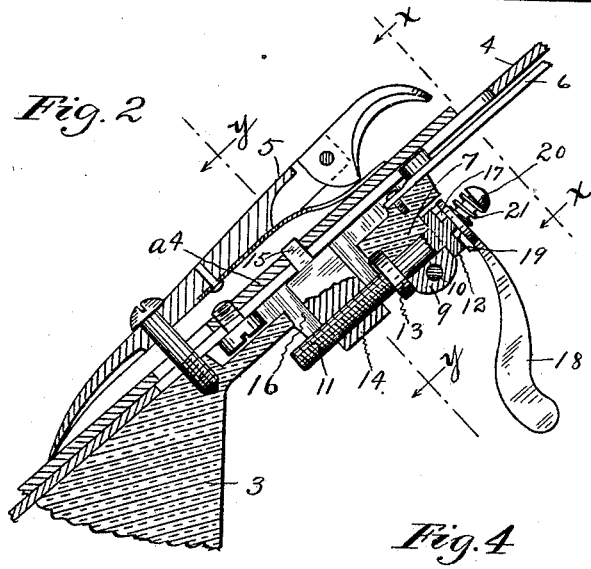
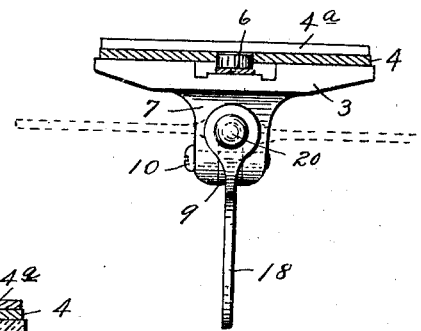
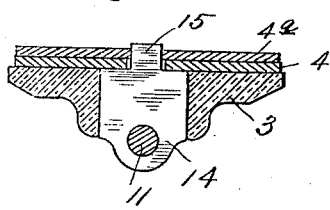
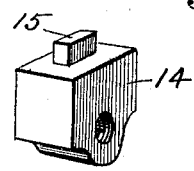
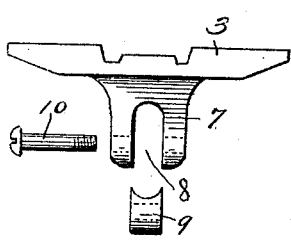
Witnesses
C. F. Kilgor
D. Krumendahl
Inventor
Lucas C. Clark
By Simonds & Hart
Attorneys No. 718,981. PATENTED JAN. 27, 1903.
L. C. CLARK.
PLANE.
APPLICATION FILED OCT. 1, 1901.
NO MODEL. 2 SHEETS—SHEET 2.
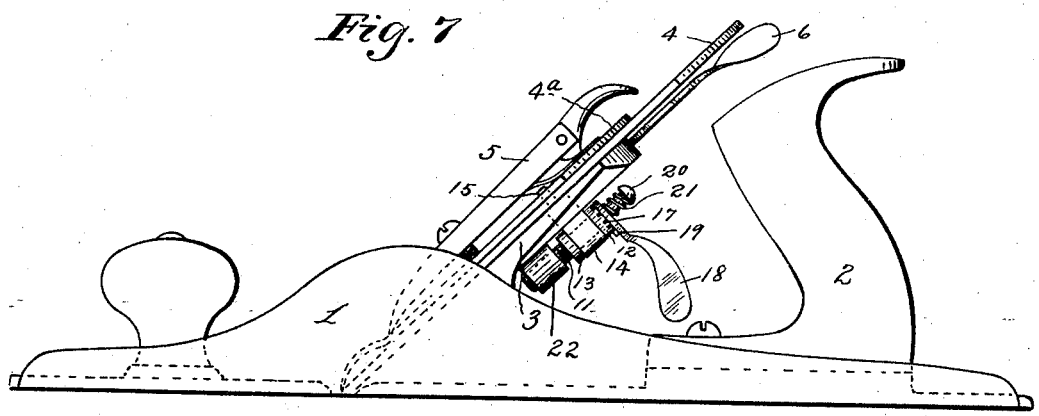
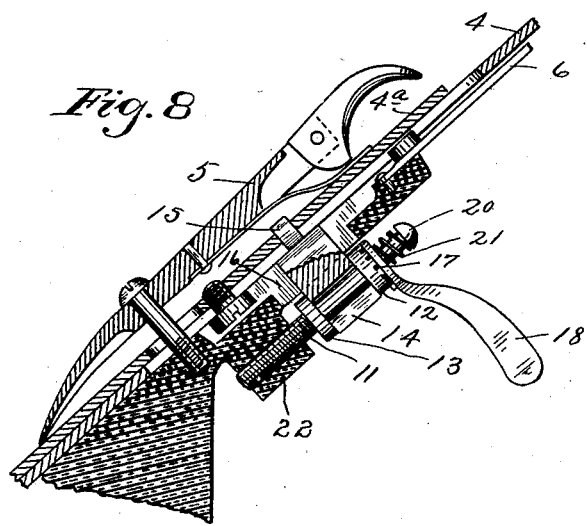
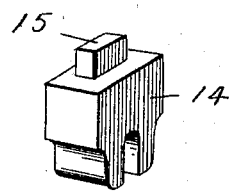
Witnesses
C. F. Kilgore
D. H. Krummendahl
Inventor
Lucas C. Clark
By Simonds & Hart
Attorneys
THE NORRIS PETERS CO., PHOTO-LITHO., WASHINGTON, D. C.

UNITED STATES PATENT OFFICE.

LUCAS C. CLARK, OF SOUTHINGTON, CONNECTICUT.

PLANE.

SPECIFICATION forming part of Letters Patent No. 718,981, dated January 27, 1903.

Application filed October 1, 1901. Serial No. 77,186. (No model.)

*To all whom it may concern:*

Be it known that I, LUCAS C. CLARK, a citizen of the United States, and a resident of Southington, in the county of Hartford and State of Connecticut, have invented certain new and useful Improvements Applicable to Planes, of which the following is a description, reference being had to the accompanying drawings, wherein—
Figure 1 is a side elevation of a plane embodying my invention. Fig. 2 is a side sectional view, on an enlarged scale, of part of the plane with my invention applied thereto. Fig. 3 is a detail view on the line $x$ $x$ of Fig. 2 looking in the direction of the arrows. Fig. 4 is a detail view on the line $y$ $y$ of Fig. 2 looking in the direction of the arrows. Fig. 5 is a view of the structure shown in Fig. 3 with the parts separated. Fig. 6 is a detail view of the block shown in Fig. 4. Fig. 7 is a view of a plane in side elevation with a modified form of my invention. Fig. 8 is a sectional elevation, on an enlarged scale, of a part of the plane embodied in my invention. Fig. 9 is a detail view of a member shown in Figs. 7 and 8.

The object of the improvement is the production of a device for adjusting the cutting-blade of the plane, which has features of novelty and advantage.

Referring to the drawings, 1 denotes the plane-body; 2, the handle. 3 is what is known as the "frog," 4 the blade, 4ᵃ the cap-plate, and 5 the clamp, these parts being arranged substantially as they are in an ordinary plane. 6 is the lever for controlling the lateral adjustment of the blade. All of these parts are of the ordinary construction, and no novelty is claimed for them.
On the upper end of the frog 3 is cast the lug 7, slotted, as at 8, having a cap or filling piece 9, adapted to be held in place in the slot by the screw 10. When this cap or filling piece is in place, a hole is left through the lug 7. A screw 11, adapted to fit in the hole through the lug 7, has at one end a head 12, which bears on one side of the lug, and a collar 13, which bears on the opposite side of the lug, as clearly shown in Fig. 2. This screw is held in place in the lug by the cap or filling piece 9 and a screw 10. Beyond the collar is a screw-threaded portion which passes through the block 14, which is threaded to correspond with the threads on the screw. This block 14 has at its upper end a projecting lug 15, which is adapted to enter the aperture in the cap-plate 4ᵃ and is capable of movement lengthwise along the screw 11 in a slot 16 in the frog 3. The upper surface of the head of the screw is notched, as at 17, and a lever 18 has a lug 19, adapted to fit the notches in the head of the screw, and is mounted on the pin 20 and normally held against the head of the screw by a spring 21.

It is evident that any rotary movement of the lever 18 when intermeshed with the head of the screw will turn the screw 11, and so move the block 14 along the screw in either direction, depending upon the direction of movement of the lever. Because of this connection of this block with the blade such a movement of the block as above noted will carry the blade up or down. In the construction shown in the drawings the block moves the cutting-blade through the medium of the cap-plate. The block might intermesh directly with the cutting-blade, but preferably it does that through the medium of the cap-plate. If considerable adjustment of the blade is necessary in order to make it cut properly, the lever 18 may be turned as far as possible in the desired direction and then lifted, so that the lug 19 is disengaged from the slot 17 in the head of the screw 11. This will permit of the lever being moved in the opposite direction without moving the screw, and the operation may be repeated as much as desired until the proper adjustment is obtained. The blade-adjusting lever may be made to move the blade in either direction, and also it may itself be moved in either direction without moving the blade. Whenever the proper adjustment of the cutting-blade is approximately secured the lever 18 may be moved to the positions shown in Figs. 1 and 2 by simply disengaging the lug 19 from the slots 17 and moving it back to that position where it lies conveniently close to the handle of the plane, so that if a slight adjustment of the blade is desired at any time it may be effected by moving the lever in the desired direction by the finger or thumb and finger without moving the hand from the handle.

It is well known that heretofore the adjustment of the blade up and down has been accomplished by a lever, one end of which engages the blade and the other end of which is bifurcated and straddles a screw, which is turned by a thumb-nut. This well-known mechanism has decided disadvantages. For instance, the size of the head of the screw must be small, because of the small space allowed for it, and the pitch of the thread of the screw is such that it is very difficult to turn the screw with such a small head. Again, there is enough backlash in the old construction to cause considerable difficulty in obtaining an accurate adjustment of the adjusting device and cutting-blade. By the use of the lever in my device I have what is equivalent, in the plane illustrated in the drawings, of a four-inch wheel, with which to turn my adjusting-screw. This permits me to use a screw of such a pitch that the backlash is practically nothing. Another decided advantage which my arrangement has over the well-known screw is that the blade may be adjusted vertically without removing the hand from the handle, and a slight adjustment may be obtained by simply moving the lever by the thumb or finger in the desired direction. In the ordinary adjustment, which has been referred to above, it is necessary to remove the hand entirely from the handle in order to operate the screw, such an arrangement being not nearly as advantageous as mine.

In Figs. 7, 8, and 9 I have shown a modification in which the block 14 is not threaded, the screw 11 being threaded into a lug 22 on the frog. The operation of the device is substantially the same as that shown in the first six figures, with the exception that here the screw moves, while in the preferred form the screw is stationary as far as lengthwise movement is concerned.

I claim as my improvement—

1. In a plane, the combination with the cutting-blade, of a frog provided on its rear face with an apertured lug, an adjusting-screw mounted in the aperture of the said lug, a transversely-arranged screw in the said lug for securing the said adjusting-screw in position, a blade-adjusting block extending to the rear of the frog and in engagement with the said screw and secured at its forward end to the said blade, and means for rotating the said screw.

2. In a plane, the combination with the cutting-blade, of a frog rigidly secured in the plane and provided in its upper portion with a longitudinally-arranged slot, a lug formed integral with the said frog, said lug having a longitudinal slot, the rear side of which is open, an apertured block arranged in the said longitudinal slot, a screw extending through the openings in the said lug and block and means for rotating the said screw.

3. In a plane, the combination with the blade, of a frog having its upper end reduced in thickness and provided with an elongated slot therein, a lug formed integral with the said frog and provided with a longitudinal aperture extending inward from the rear side of the lug, a block slidably mounted in the slot of the frog, and having its inner end secured to the blade, an adjusting-screw mounted in the said lug and being in screw-threaded engagement with the said block, a transversely-arranged screw secured in the said lug, and a cap on the said screw, substantially as and for the purpose specified.

4. In a plane, the combination with the blade, of a frog provided in its upper end with an elongated slot, a block slidably mounted in the said slot and having its inner end secured to the blade, a lug formed integral with the said frog and provided with a longitudinal slot, an adjusting-screw having its lower end in screw-threaded engagement with the said block, and its upper end arranged in the aperture of the said lug, a head formed integral with the said screw and bearing on the lower face of the said lug, a collar formed integral with the screw and bearing on the upper face of the said lug, and means for adjusting the said screw.

5. In a plane the combination of a cutting-blade, an adjusting-screw provided with a notched head, means carried by said screw and engaging the blade, whereby the rotation of the screw adjusts the blade longitudinally, and a lever rotatably mounted on said screw and extending radially therefrom, said lever being free to tilt thereon to engage and disengage therewith to rotate it, substantially as described.

6. In a plane, the combination of a cutting-blade, an adjusting-screw provided with a notched head, means carried by said screw and engaging the blade whereby the rotation of the screw adjusts the screw longitudinally, a lever rotatably mounted on said screw and extending radially therefrom, and being free to tilt thereon to engage and disengage therewith to rotate it, and a spring to normally hold the lever in engagement with the screw.

7. In a plane the combination of the cutting-blade, the adjusting-screw having a notched head, means actuated by the said screw for adjusting the said blade, an adjusting-lever mounted on said screw and adapted to engage or be disengaged from the notched head of the said screw, said lever being adapted and located to be operated by the hand of the operator grasping the handle of the plane, and a spring to normally hold the lever in engagement with the said screw.

LUCAS C. CLARK.

Witnesses:
W. E. SIMONDS,
D. C. KREIMENDAHL.